United States Patent [19]

Arcangeli

[11] Patent Number: 4,947,652
[45] Date of Patent: Aug. 14, 1990

[54] ICE LEVEL CONTROL FOR FLAKE-ICE MAKER

[76] Inventor: Henio R. Arcangeli, 459 21st Pl., Santa Monica, Calif. 90402

[21] Appl. No.: 338,847

[22] Filed: Apr. 17, 1989

[51] Int. Cl.$^5$ .............................................. F25C 1/14
[52] U.S. Cl. ......................................... 62/71; 62/137; 62/354
[58] Field of Search ........................ 62/137, 354, 710

[56] References Cited

U.S. PATENT DOCUMENTS

| | | | |
|---|---|---|---|
| 2,940,275 | 6/1960 | Raver | 62/137 |
| 2,961,842 | 11/1960 | Wright | 62/137 |
| 3,192,734 | 7/1965 | Swanson | 62/137 |
| 4,662,182 | 5/1987 | Tsukiyama et al. | 62/137 |
| 4,771,609 | 9/1988 | Funabashi | 62/137 |
| 4,787,539 | 11/1988 | Uchida et al. | 62/137 X |

Primary Examiner—William E. Tapolcai
Attorney, Agent, or Firm—Natan Epstein; William H. Pavitt, Jr.

[57] ABSTRACT

An ice level sensor for a flake-ice icemaker of the type having an electrically grounded rotary shaft for scraping ice from a refrigerated surface into an underlying ice bin has a contact plate insulated connected to a control circuit, a metallic sensing arm suspended from and electrically connected to the shaft for sweeping a path in the ice bin, the sensing arm moving against the plate on contact with accumulated ice thereby completing an electrical circuit through the drive shaft and causing the control circuit to stop the icemaker.

19 Claims, 3 Drawing Sheets

ICE LEVEL CONTROL FOR FLAKE-ICE MAKER

BACKGROUND OF THE INVENTION

1. Field of the Invention

The present invention relates generally to ice making equipment and more particularly is directed to ice level sensors and controls for commercial volume flake-ice makers.

2. State of the Prior Art

Commercial type ice makers typically consist of an ice making head usually of cylindrical configuration in which a water filled container or trough has at least one refrigerated wall cooled by a flow of refrigerant gas, and a motor driven scraper which continuously breaks up ice forming on the refrigerated surface into ice flakes. The ice flakes are harvested from the surface of the water by mechanical paddles or equivalent means, and are discharged through one or more ice chutes into an underlying ice bin.

A problem in the past has been the excessive accumulation of ice in such an ice bin. Once the bin fills up with ice, new ice discharging from the head cannot drop through the chutes and the head becomes jammed with ice. The consequences can range from serious inconvenience, because the head must be cleared of ice, to severe mechanical damage to the ice making head including broken drive shafts, broken bearings and the like. It is therefore highly desirable to provide such ice makers with a reliable means for detecting excessive accumulations of ice in the collecting bin before the ice backs up in the ice making head.

Various devices and arrangements have been conceived for this deceptively simple purpose. All of them have been found to suffer from shortcomings either in terms of reliability, cost or complexity. One ice level detector available from the Howe Corporation as an accessory for their flake-ice makers consists of a small electric motor coupled through a friction clutch to a small fan blade arrangement. This assembly is mounted within the ice collecting bin at an ice level which is considered safe for operation of the ice making head. The fan blades are continuously driven by the electric motor. If ice builds up in the bin to an excessive level, it stops the rotating blades which disengage from the motor through the clutch and actuate a control relay arrangement which stops further operation of the ice making head while the ice level remains excessive in the bin. Once sufficient ice has been removed through normal consumption from the bin, the sensor paddles again are free to rotate and re-engaged to the continuously powered drive motor, re-enabling operation of the ice making head. This system is costly and inconvenient to install, and more complex than is desirable.

SUMMARY OF THE INVENTION

The present invention addresses the aforementioned need by providing a bin switch device for installation in a flake-ice ice maker of the type having a rotary scraper for flaking ice from a refrigerated surface for discharge into an underlying ice-bin. The bin switch of this invention includes a sensing arm or paddle attached to the rotary scraper of the ice maker for sweeping a path in the ice-bin, and an electrical switch actuatable upon contact of the sensor arm with accumulated ice in the ice-bin for interrupting operation of the ice-maker. The sensing paddle or arm is attached to an existing central rotary drive shaft in the ice-maker by means of an extension shaft rod threaded into the lower end of the shaft. The sensing arm is eccentrically dependent from the extension shaft so that it sweeps a circular path in the ice bin as the auger drive shaft of the ice maker turns.

This invention also includes a method for limiting ice accumulation in an ice-maker mounted on an ice collecting bin, and including a motor driven rotary shaft. The method involves attaching a sensor element to the rotary shaft for sweeping a path at a predetermined level in the ice collecting bin, and connecting the sensor element for interrupting operation of the ice-maker in response to contact with accumulated ice in the bin.

DETAILED DESCRIPTION OF THE PREFERRED EMBODIMENTS

Figure 1:
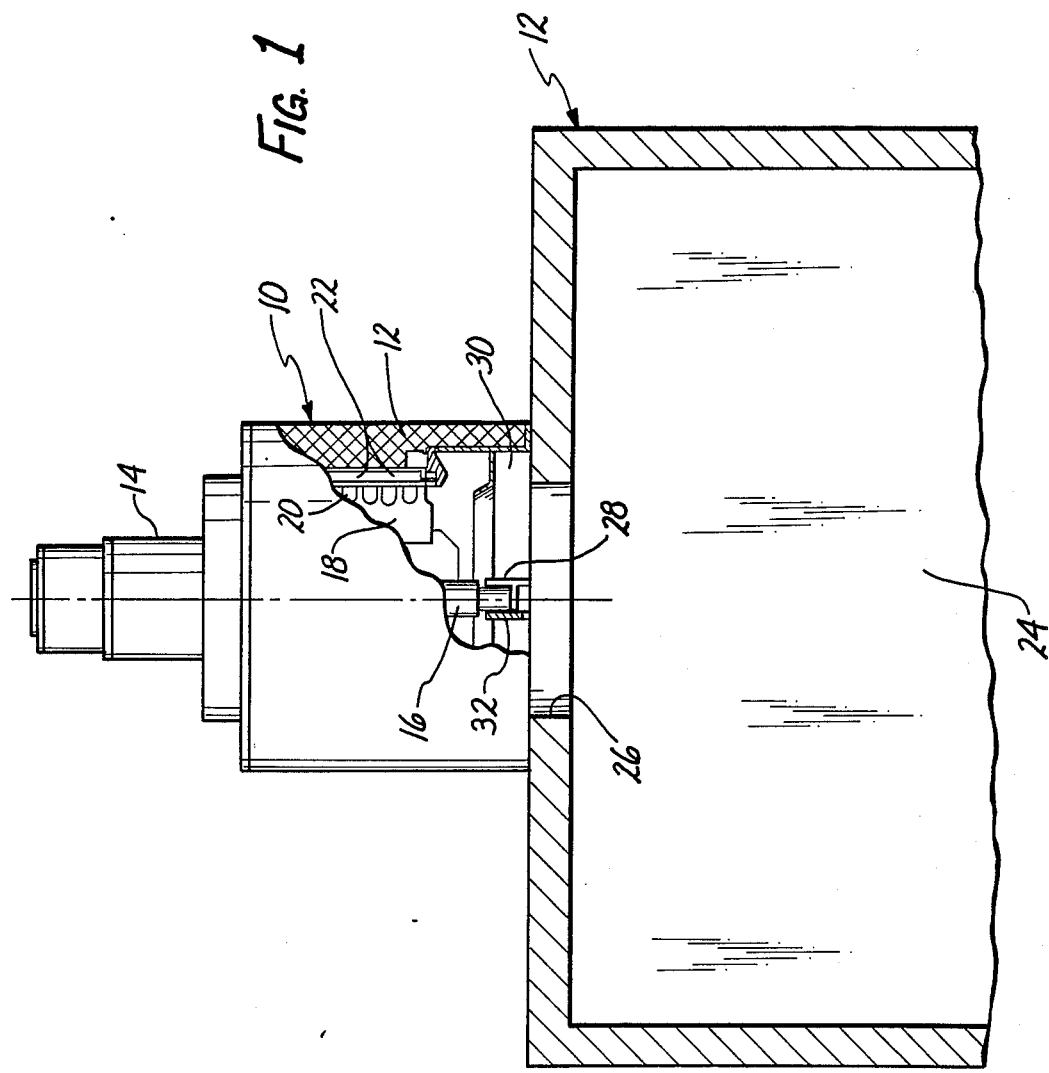
FIG. 1 is an elevational cross-section of a typical ice maker suitable for improvement according to the present invention.

Turning to FIG. 1, a typical ice maker machine for larger quantity manufacture of flake-ice includes an ice flaker 10 mounted on top of an insulated ice storage bin 12. The ice flaker 10 as shown in FIG. 1 is of conventional manufacture and specifically illustrates an ice maker manufactured and commercially distributed by the Howe Corporation of Chicago, Ill. The flaker head 10 includes an insulated housing 12 on which is mounted a drive motor 14 geared for turning a rotary center shaft 16 which carries an ice scraper 18 which turns within a cylindrical trough filled with water, the outer surface 20 of which is refrigerated by a flow of refrigerant gas through refrigerant passages 22 in close heat exchanging contact with the outer wall of the trough. Water in contact with this outer wall 20 freezes and builds up to a relatively thin layer of ice. The ice is not allowed to exceed a predetermined thickness by the revolving scraper 18 which continuously breaks up and scrapes off ice flakes from this refrigerated wall. The construction and operation of such an ice flaker is conventional and need not be described further for purposes of explanation of the present invention.

The noteworthy features which bear on the invention to be described are the fact that flake-ice manufactured by the aforedescribed process is harvested from the water trough and discharged into the interior 24 of the bin 12 for storage until the ice is needed for use at which time it is manually removed from the bin as needed. The harvested flake-ice is discharged into the bin through a bin opening 26 which underlies and normally is centered with the cylindrical ice flaker housing 12. The rotary shaft 16 is supported between upper and lower bronze bearings 28 which are in turn supported within a cast aluminum bearing-housing 30. The bottom end of the rotary shaft 16 is seated within a cylindrical bearing 28 and turns on a bronze bearing plate 32 in the conventional machine.

Figure 2:
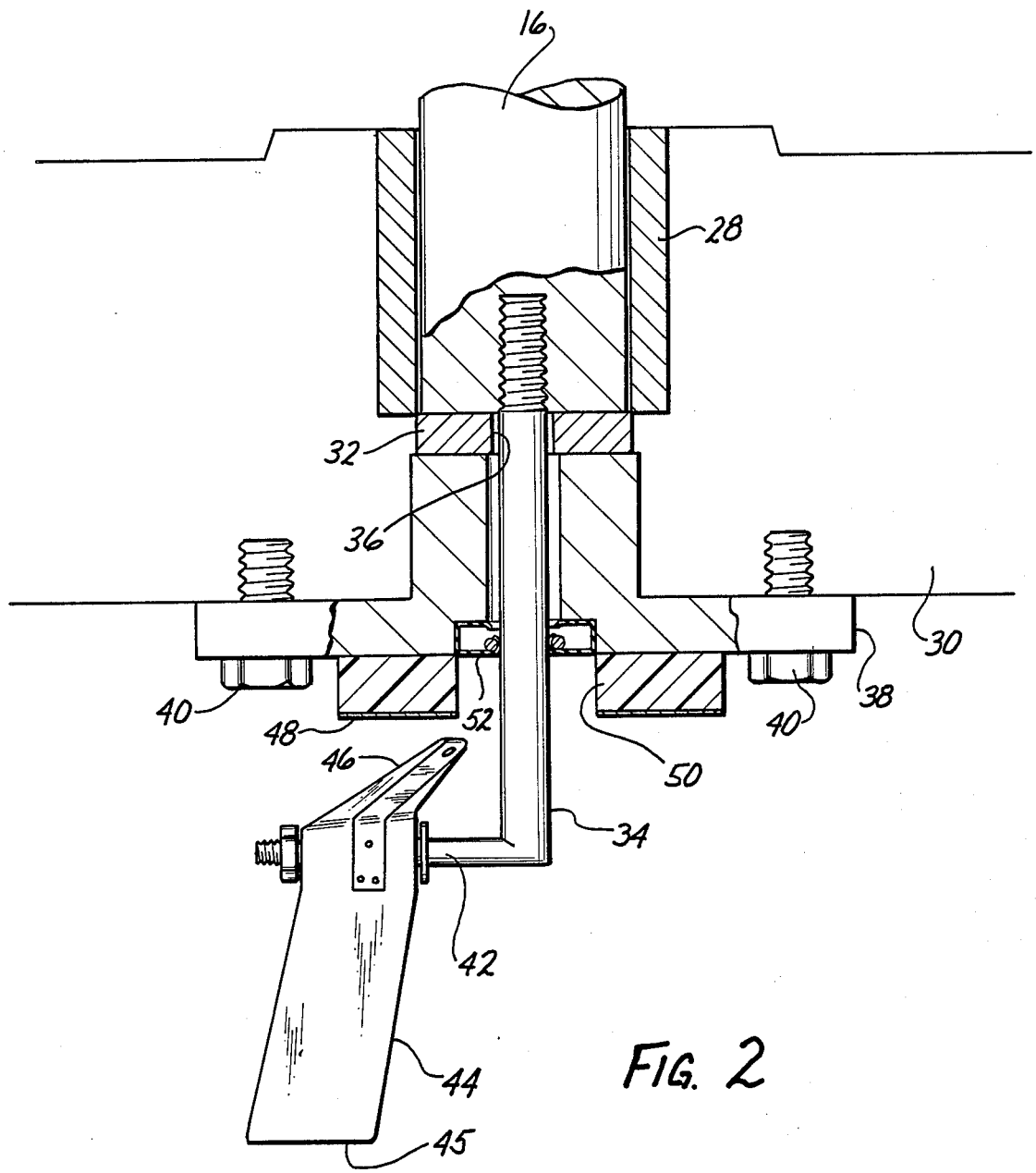
FIG. 2 is an elevational fragmentary cross-section of the novel ice bin level sensor installed in the ice maker of FIG. 1.

Turning now to FIG. 2, the improvement of the present invention to the conventional machine will be described. The bottom end of the rotary shaft 16 is axially bored and threaded to receive the threated end of an extension shaft 34. The extension shaft passes through a hole 36 drilled for this purpose in the existing bronze bearing plate 32 of the ice flaker 10. The bearing plate 32 is conventionally supported within the bearing housing 30 by a cast-aluminum star-shaped closure 38 which is fixed to the underside of the bearing housing 30 by bolts 40. The extension shaft 34 is bent or otherwise extends at its lower end at a right angle to form a carrier arm 42, on which is supported a sensor paddle 44. The paddle 44 is freely pivotable about the carrier arm 42 and has an upper contact portion 46 above the contact arm 42 bent to a trailing angle, which is not a critical angle, so that the contact portion 46 trails the carrier 42 as the extension shaft 34 turns with the main rotary shaft 16 of the ice maker 10. The overall length of the extension shaft 34 and sensor paddle 44 is such that the lower end of the sensor paddle is at a level within the ice bin 12 at which level it is desirable to limit further ice accumulation in the bin 12.

The bin switch improvement of this invention also includes an electrical contact plate 48 which is preferably a circular plate with a central opening adhesively or otherwise supported to an insulating spacer 50 fixed to the underside of the bearing support 38 by means of screws and epoxy adhesive, or other secure and convenient means. In the conventional machine, the rotary shaft 16 is electrically connected to the electrical ground of the machine 10 by virtue of contact with the bronze bearings 28, 32, and through aluminum bearing housing 30 and other metallic structural components of the ice maker 10. The metallic extension shaft 34 therefore is likewise electrically grounded to the machine 10 and so is the metallic e.g. stainless steel, sensor paddle 44 by virtue of its contact with the metallic carrier arm 42 of the extension shaft 34. The bin ice level sensor assembly added onto the existing ice maker 10 as shown in FIG. 2 includes the extension shaft 34 from which depends the sensor paddle 44 and the fixed contact plate 48. It is also desirable to add a grease seal or gasket 52 around the extension shaft 34 so as to prevent lubricant grease normally present within the shaft bearing 28 and on bearing plate 32 from flowing down through the hole 36 and eventually onto the ice in the bin interior 24.

A single electrical connection needs to be made between the ice level sensor assembly and the electrical control circuit of the ice maker 10. Such a single connection is made between the contact plate 48 and a control switch, relay or other device capable of interrupting or otherwise taking appropriate controlling action over the operation of the ice maker 10 upon excessive accumulation of ice within the bin 12. The maximum level of ice accumulation in the bin interior 24 is determined by the level of the lower end 45 of the sensor paddle 44 in the bin interior 24. The paddle 44 revolves continuously in a circular path within the bin interior 24 as the extension shaft 34 turns with the rotary shaft 16 of the ice flaker 10. When the ice level reaches the bottom end 45 of the sensor paddle 44, the lower end 45 is held back by the ice accumulation pivoting the paddle 44 about the carrier arm 42, and causing the trailing portion 46 of the sensor paddle to lift up against the contact plate 48 thereby electrically grounding the contact plate 48. The ice level assembly of this invention therefore operates as an electrical switch capable of actuating a suitable control circuit for interrupting operation of the ice maker 10 upon detection of a predetermined ice level in the bin 12. The ice level sensor assembly is highly reliable in operation and requires minimal modification to the existing machine and a small number of inexpensive components which are easily installed on the ice maker 10 itself, rather than inside the bin 12. This installation can be conveniently made while the ice flaker 10 is separated from the bin, and the bin switch takes its proper position when the flaker head 10 is subsequently installed on the bin 12.

Figure 3:
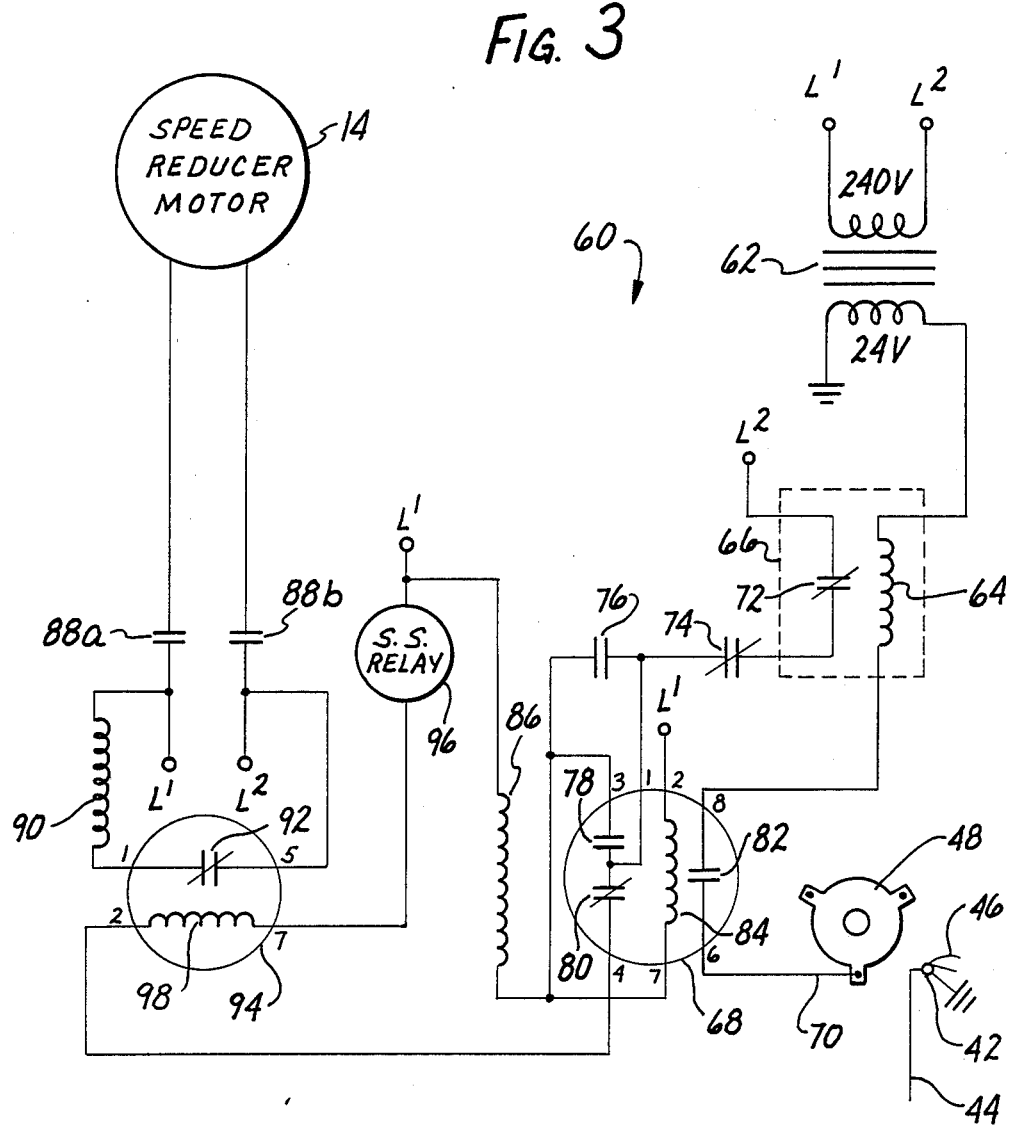
FIG. 3 is an electrical schematic diagram of a control circuit including the ice level sensor switch for controlling operation of the ice maker and limiting the ice level in the ice bin.

FIG. 3 shows an electrical control circuit for the ice flaker 10 which makes use of the bin switch ice level sensor assembly of FIG. 2 for controlling operation of the ice flaker 10 in response to ice build up in the bin 12. The control circuit 60 includes a power transformer 62 which converts A/C line voltage between A/C lines L1 and L2, to a low voltage at the secondary winding, one side of which is grounded and the other side connected through the coil 64 of relay 66, and through contacts 8 and 6 of relay 68 to the contact plate 48 of the bin switch device shown in FIG. 2, by means of the earlier mentioned single connection to the contact plate 48 which is shown as conductor 70 in the diagram of FIG. 3.

The circuit diagram of FIG. 3 is shown with the ice flaker 10 stopped i.e. inoperative for making ice. Contacts 72 of relay 66 are normally closed with the bin switch device contacts open i.e. with the contact arm 46 of the sensor paddle away from the contact plate 48. The power line L2 is thus connected through relay 66 and normally-closed Stop switch 74 to pin 1 of relay 68, and also through a normally open momentary contact Start switch 76 to pins 3 and 7 of relay 68. The relay 68 is internally configured as shown in the diagram and includes three sets of switch contacts 78, 80 and 82, all controlled by coil 84 which is connected between pins 2 and 7. Pin 2 is connected to A/C line L1 so that actuation of the start button 76 connects the other end of the coil 84 to A/C line L2 completing the A/C circuit through the relay coil and actuating the relay by closing relay contacts 78 and 82 while opening relay contacts 80. Pin 7 is now connected through relay contact 78 and relay pin 1, and through normally closed stop switch 74 to A/C line L2 so that current flows through coil 84 and relay 68 remains ON.

The liquid line solenoid 86 controls a valve in the refrigerant circuit which connects a conventional refrigerant compressor (not shown) to the refrigerant conduits 22 of the ice maker 10 of FIG. 1. With A/C power flowing through the liquid line solenoid 86 the refrigerant circuit is open and the compressor is able to draw refrigerant from the ice maker 10, compress it to a high pressure at which the refrigerant liquefies and then deliver the liquefied refrigerant through heat exchangers which cool the liquid refrigerant, and through expansion nozzles back to the conduits 22 of the ice maker 10 where, upon expansion, the refrigerant evaporates and cools the wall 20 for freezing the water in contact with the opposite side of the wall. Upon turning ON the relay 68, therefore, the lower end of solenoid 86 is connected to A/C line L2, while the upper end of coil 86 is normally connected to the other side of the A/C line L1 as shown. With the solenoid 86 powered ON, the refrigerant circuit is open and the compressor is able to deliver refrigerant to the ice maker. At the same time, A/C power is delivered to the drive motor 14 which turns the rotary shaft 16 of the ice maker 10 through contactor switches 88a and 88b controlled by contactor 90 which is in series with normally open relay contacts 92 of power relay 94. The contactor switch contacts 88a and 88b are normally closed.

In normal operation of the control circuit 60 and ice maker 10 the bin switch device is open as shown in FIG. 3 with the sensor paddle 44 hanging freely within the ice bin 12 In the event that sufficient ice accumulates in the bin 12, forward movement of the paddle 44 is interrupted by contact with accumulated ice causing the paddle to pivot about the arm 42, counter-clockwise in FIG. 3 so that the contact arm 46 moves up and into electrical contact with the plate 48, thereby grounding the coil 64 of relay 66. This completes the power circuit through the relay coil 64 and opens contact 72 of relay 66 thereby interrupting the connection to A/C line L2. This in turn interrupts power to the coil 84 of relay 68, deactivating this relay and returning it to the state shown in FIG. 3. Power to the bin switch device is interrupted by opening of contact 82, the connection to A/C line L2 is likewise interrupted for the liquid line solenoid 86 which closes the flow of the refrigerant to the compressor inlet. The compressor, which is conventional and not illustrated, is equipped with a low pressure control switch, which upon sensing a low pressure condition at the compressor inlet caused by deactivation of the liquid line solenoid and closure of flow at the compressor inlet, stops the compressor. At the same time, contacts 80 close, applying power to a solid state relay 94 which is of the "delay-on-make" type and includes a timer feature adjustable to a preset delay time of e.g. between 5 and 8 minutes. Upon lapse of the preset delay period, relay 94 closes to connect pin 7 of relay 94 to A/C line L1 thereby connecting the relay coil 98 across A/C lines L1 and L2. The connection to line L2 occurs through pin 4 of relay 68, the normally closed stop switch 74, and normally closed relay contact 72. A/C power across coil 98 closes the relay contacts 92 so that power flows to contactor coil 90 which opens the contactor points 88a, 88b thereby interrupting power to the drive motor 14 and stopping the drive shafts 16 and thus interrupting further operation of the ice maker 10. The water pump which is conventional in such machines for supplying water to the trough in the ice maker 10 may be connected in parallel with the motor 14 to the contactor points 88a and 88b so that the pump is also stopped together with motor 14.

From the foregoing description of the circuit 60 it will be apparent that the dependability and simplicity of the mechanical bin switch is carried over into the electrical control circuit, in that only a momentary closure of the bin switch is necessary to start the machine shutdown sequence just described to stop further operation of the machine. A momentary contact between the sensor paddle arm 46 and sensor plate 48 of the bin switch suffice to momentarily apply power to the coil 64 and briefly open relay points 72 of relay 66. As has been described, this momentary opening of contact points 72 will then turn OFF the control relay 68 and eventually bring about complete stoppage of the ice maker 10.

While a particular embodiment of the invention has been described and illustrated for purposes of clarity and example it will be understood that many changes, substitutions and modifications to the described embodiment will be apparent to those possessed of ordinary skill in the art. In particular, the bin switch assembly shown in FIG. 2 can be used with electrical or electronic control systems other than the system 60 shown in FIG. 3 to bring about a safe interruption of ice maker operation upon sensing of a predetermined ice level in the storage bin 12. It will therefore be understood that the scope of the invention is not to be limited to the described claims.

What is claimed is:

1. A flake-ice icemaker of the type having a housing, a refrigerated surface in said housing, a rotary scraper for scraping ice from said refrigerated surface and discharging the scraped ice into an underlying ice bin;
    said rotary scraper driven by a vertical rotary drive shaft electrically grounded to a common ground with a control circuit connected for controlling rotation of said scraper;
    a sensing arm attached to said drive shaft for sweeping a path in said ice bin; and
    switch means actuatable upon contact of said arm means with accumulated ice in said ice bin for completing an electrical circuit through said drive shaft thereby to interrupt operation of the icemaker.

2. The improvement of claim 1 wherein said switch means comprise contact plate means insulated from said common ground and connected to said control circuit means; and
    contact means on said sensing arm means electrically connected to said drive shaft, whereby contact of said arm means with accumulated ice is operative for establishing an electrical path between said contact plate and said drive shaft and thence to said common ground.

3. The improvement of claim 2 wherein said electrically conductive means comprise a support shaft affixed to the lower end of said drive shaft for supporting said sensing arm means.

4. The improvement of claim 3 wherein said sensing arm means is a metallic arm pivoted on said support shaft in electrical contact therewith, said sensing arm having a lower portion sweeping a circular path in said ice bin, and an upper portion normally in spaced relationship with said contact plate and arranged such that contact of a lower end of said sensing arm with accumulated ice retarding movement of said lower end through said path is operative for bringing said upper end into electrical contact with said contact plate.

5. The device of claim 4 wherein said contact plate is an annular metallic plate concentric with said support shaft.

6. The device of claim 5 wherein said support shaft is a metallic shaft threaded into an axial bore in the lower end of said drive shaft.

7. The device of claim 3 wherein said drive shaft is seated on a metallic end bearing, said bearing having a central hole for admitting said support shaft.

8. The device of claim 3 further comprising grease seal means about said support shaft for preventing material lubricating said drive shaft from falling into said ice bin.

9. The device of claim 3 wherein said support shaft is L-shaped with a vertical portion attached to the lower end of said drive shaft and a lateral portion to which is pivoted said sensing arm means.

10. A method for installing an ice level sensor in a flake ice icemaker of the type having a rotary vertical drive shaft for scraping ice from a refrigerated surface into an underlying ice bin, said drive shaft being electrically conductive and grounded to a common system ground, comprising the steps of:

affixing a support shaft extending axially from the lower end of said drive shaft;

supporting sensing means on said support shaft for sweeping a circular path in said underlying ice bin and in electrical contact with said drive shaft; and mounting contact means insulated from said common ground in normally spaced relationship with said sensing means, the sensing means being arranged so as to make electrical contact with said contact means upon encountering an obstruction along said path indicative of ice accumulation; and connecting control means between said contact means and said common ground operative for interrupting machine operation upon completion o an electrical path between the drive shaft and said sensing means.

11. The method of claim 10 wherein said drive shaft rests on an end bearing, and further comprising the step of drilling a hole in said end bearing for passing said support shaft into an attachment with said drive shaft.

12. The method of claim 11 further comprising the step of drilling a threaded bore axially in the lower end of said drive shaft, and threading an upper end of said support shaft into said threaded bore.

13. The method of claim 12 further comprising the step of mounting a grease seal about said support shaft to prevent material lubricating said drive shaft from passing into said ice bin through said hole in the end bearing.

14. The method of claim 10, wherein said step of providing said contact plate comprises the step of mounting an annular contact plate concentrically with said support shaft.

15. In a flake-ice icemaker of the type having a housing, a refrigerated surface in said housing, a rotary scraper for scraping ice from said refrigerated surface and discharging the scraped ice into an underlying ice bin, said rotary scraper driven by a vertical rotary drive shaft electrically grounded to a common ground with a control circuit connected for controlling rotation o said scraper, the improvement comprising:

a contact plate insulated from said common ground and connected to said control circuit;

a sensing arm attached to said drive shaft for sweeping a path in said ice bin, said sensing arm having an electrically conductive portion connected with said drive shaft and moveable into contact with said contact plate means upon contact of said arm with accumulated ice in said ice bin thereby completing an electrical circuit through said drive shaft enabling said control means for interrupting operation of the icemaker.

16. The improvement of claim 15 wherein said sensing arm is pivoted on an electrically conductive support shaft affixed to the lower end of said drive shaft.

17. The improvement of claim 16 wherein said sensing arm means is a metallic arm pivoted on said support shaft in electrical contact therewith, said sensing arm having a lower portion sweeping a circular path in said ice bin, and an upper portion normally in spaced relationship with said contact plate and arranged such that contact of a lower end of said sensing arm with accumulated ice is operative for bringing said upper end into electrical contact with said contact plate.

18. In a flake-ice icemaker of the type having a housing, a refrigerated surface in said housing, a rotary scraper for scraping ice from said refrigerated surface and discharging the scraped ice into an underlying ice bin, said rotary scraper driven by a vertical rotary drive shaft electrically grounded to a common ground with a control circuit connected for controlling rotation of said scraper, the improvement comprising:

a contact plate insulated from said common ground and connected to said control circuit;

a metallic support attached to the lower end of said drive shaft for rotation therewith;

a metallic sensing arm pivoted to said metallic support for sweeping a path in said ice bin, said sensing arm having an upper end moveable into contact with said contact plate means upon contact of a lower end of said arm with accumulated ice in said ice bin thereby completing an electrical circuit between said drive shaft and said contact plate and enabling said control means for interrupting operation of the icemaker.

19. A kit of parts for providing an ice level sensor in a flake-ice icemaker of the type having a housing, a refrigerated surface in said housing, a rotary scraper for scraping ice from said refrigerated surface and discharging the scraped ice into an underlying ice bin, said rotary scraper driven by a vertical rotary drive shaft electrically grounded to a common ground with a control circuit connected for controlling rotation of said scraper, comprising:

a contact plate insulated form said common ground for connection to said control circuit;

a metallic support attachable to the lower end of said drive shaft for rotation therewith;

a metallic sensing arm pivoted to said metallic support for sweeping a path in said ice bin, said sensing arm having an upper end moveable into contact with said contact plate means upon contact of a lower end of said arm with accumulated ice in said ice bin thereby completing an electrical circuit between said drive shaft and said contact plate and enabling said control means for interrupting operation of the icemaker.

* * * * *